Feb. 27, 1951 S. R. WAGNER 2,543,080

TELEPHONE DIAL TYPE TRANSMITTER WITH ADJUSTABLE MAIN SPRING

Filed Aug. 14, 1947 2 Sheets-Sheet 1

FIG. 1-A.

INVENTOR.
STEPHEN R. WAGNER

BY Robert Harding Jr.

ATTORNEY.

Feb. 27, 1951

S. R. WAGNER
TELEPHONE DIAL TYPE TRANSMITTER
WITH ADJUSTABLE MAIN SPRING 2,543,080

Filed Aug. 14, 1947

2 Sheets-Sheet 2

INVENTOR.
STEPHEN R. WAGNER
BY Robert Harding Jr.
ATTORNEY.

Patented Feb. 27, 1951 2,543,080

UNITED STATES PATENT OFFICE 2,543,080

TELEPHONE DIAL TYPE TRANSMITTER WITH ADJUSTABLE MAIN SPRING

Stephen R. Wagner, East Orange, N. J., assignor, by mesne assignments, to Federal Telephone and Radio Corporation, New York, N. Y., a corporation of Delaware Application August 14, 1947, Serial No. 768,523

11 Claims. (Cl. 179—90)

This invention relates to substation impulse senders for automatic telephone exchange systems.

The object of this invention is to provide a substation impulse sender which is inexpensive to make and operates with a minimum of noise and a maximum of efficiency.

A feature of this invention is a dampening spring provided in the contact actuating unit of the substation impulse sender.

Another feature is a unitary metal stamping for supporting a plurality of the substation impulse sender elements.

Still another feature of this invention is a resilient stop for the dial just before it returns to zero position.

These and other features will more clearly appear from the following detailed description of a preferred embodiment thereof taken in conjunction with the drawings, in which:

Fig. 1 is a top plan view of the front of the device;

Fig. 1*a* is an elevation on lines 1A of Fig. 1 showing the dial stop;

Figure 1:
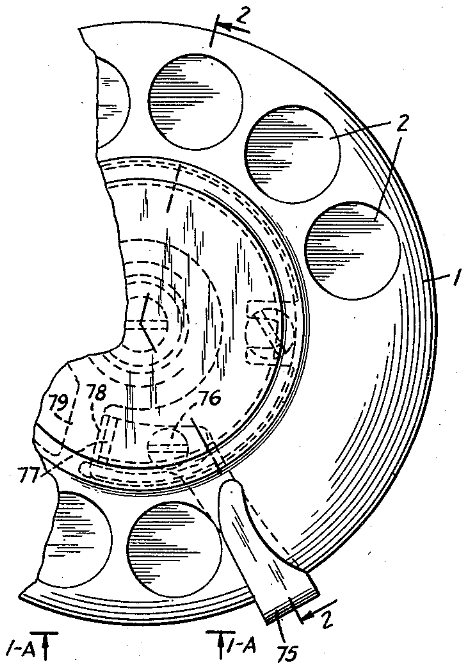

The substation impulse sender consists of the customary dial 1 having finger holes 2 for rotating the dial in a clockwise direction from a zero position through a plurality of operating positions. Beneath the finger holes a number plate 3 is provided on which numbers and letters may be inscribed to designate each finger hole. Number plate is mounted on a dial base or back plate 4 through which hollow shaft 5 containing main spring 6 passes. The center of the dial is recessed at 7 and a retainer spring 8 holds a transparent cover 9 over a number card 10 on a disc 10′ in place over a binding head screw 11 which by means of washer 12 and key washer 13 hold dial 1, shaft 5 and back plate 4 together.

At the other end of shaft 5 a spring support 14, fastened to a bracket 15 by a screw 16, engages one end of main spring 6. When shaft 5 is rotated in a clockwise direction by dial 1, spring 6 is wound relative to the support 14 so that when the dial is released the spring drives the shaft and dial in a counter-clockwise direction to normal or zero position.

Figure 3:
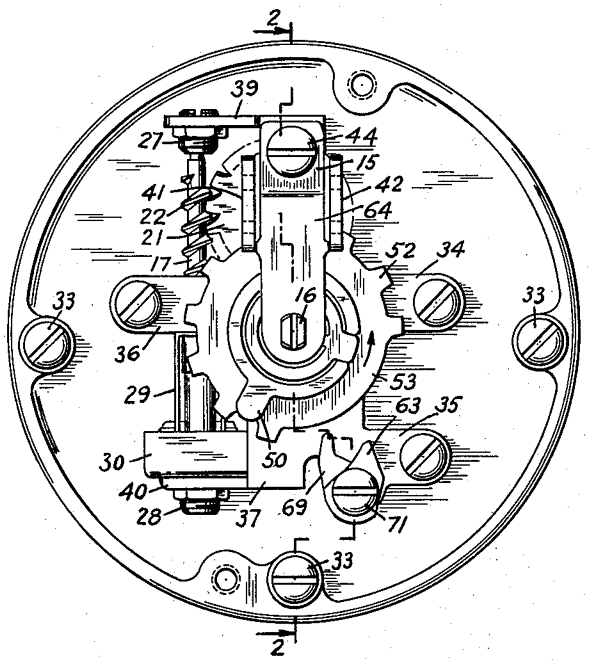
Fig. 3 is a top plan view of the back of the device.

A gear 19 mounted on shaft 5 constantly meshes with a pinion 18 carried by spindle 20. The spindle 20 also carries a gear wheel 21 to drive through gear 22 and shaft 17 a speed governor (Fig. 3). One end of spindle 20 is journaled in back plate 4 and the other end, around which a spring 23 is placed, in mounting plate 26.

The speed governor is rotatably mounted within bearing assemblies 27 and 28 and has flexible arms 29 extending towards one end of the assembly and into a drum 30 against the inside surface of which the arms will rub when the governor operates to prevent main spring 6 from returning dial 1 to zero position at an excessive speed.

Figure 2:
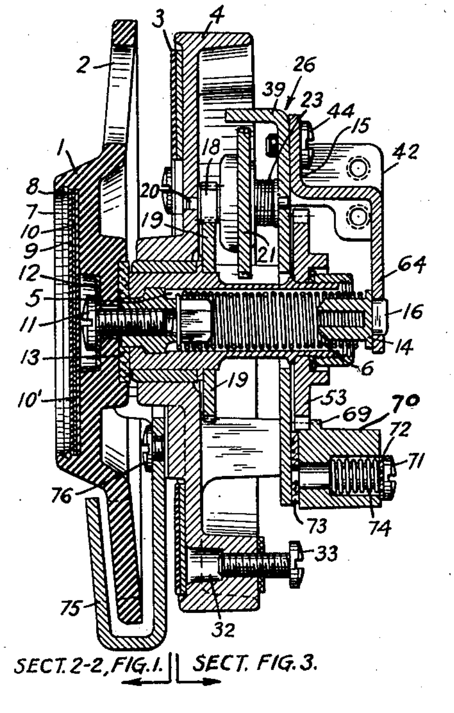
Fig. 2 is a composite of the cross sections on the lines 2—2 of Figs. 1 and 3.
Figure 2:
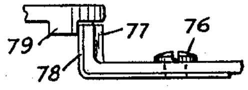
Figure 5:
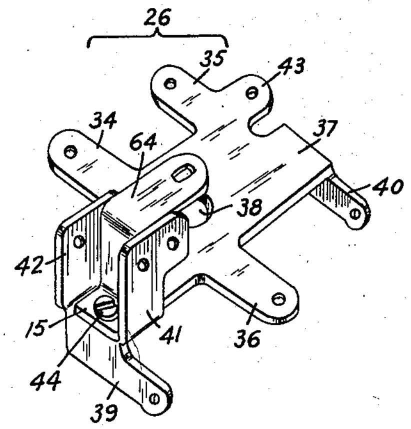
Fig. 5 is a perspective view of the mounting plate.

Mounting plate 26 (Fig. 5) formed out of a single metal stamping and having a plurality of arms, is fastened to three bushings 32, only one of which is shown (Fig. 2) projecting from back plate 4 by screws 33 and three arms 34, 35 and 36 extending in the same plane as body portion 37 of the plate 26. Substantially in the center of the mounting plate a hole 38 is provided through which shaft 5 extends. Two arms 39 and 40 are bent down towards back plate 4 and at right angles to the body of the mounting plate to provide supports for bearings 27 and 28 of the speed governor. Two other arms 41 and 42 are bent up at right angles to the rest of the mounting plate and away from the back plate to provide supports for a set of short circuiting contacts and a set of impulse sending contacts. An arm 43 also extending in the same plane as body portion 37 provides a support for a contact actuating unit 70. Bracket 15 for spring support 14 is attached to the mounting plate by screw 44 between arms 41 and 42.

Figure 4:
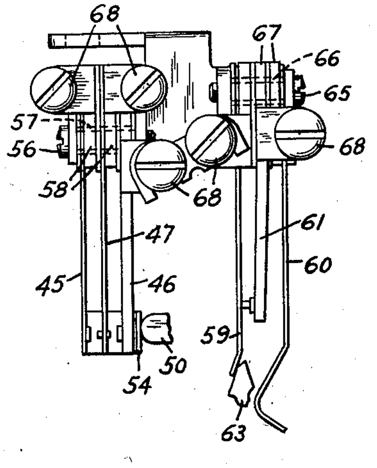
Fig. 4 is a top plan view of the short circuiting and impulse sending contacts.

The short circuiting contacts (Fig. 4) consist of leaf springs 45, 46 and 47. When the dial is in zero position a lug 50 formed on a toothed wheel 53 having teeth 52 contacts a projection 54 extending from spring 45 to close in the well known manner a circuit (not shown) between the transmitter and the receiver of the subscriber's set. However, as soon as dial 1 is rotated lug 50 moves away from projection 54 and springs 45, 46 and 47 contact one another and short circuit in the well known manner the receiver from the transmitter. Screw 56 in bushing 57 holds elements 45, 46 and 47 with insulation 58 therebetween to arm 40 of mounting plate 26.

The impulse spending contact assembly consists of leaf springs 59, 60 and 61. A contact actuating pawl 63 of the unit 70 is situated between the free ends of springs 59 and 60. Under conditions to be described the pawl 63 is rocked against spring 59 sufficiently hard to break contact between 59 and 61 for an instant thereby sending an impulse over a line circuit (not shown) in the well-known manner. Screw 65 in bushing 66 holds elements 59, 60 and 61 with spacer 67 therebetween to arm 42 of the mounting plate.

The edges of elements 59, 60 and 61 of the impulse sending contact assembly and the edges of elements 45, 46 and 47 of the short contact assembly lie preferably but not necessarily in a plane with surface 64 of bracket 15 substantially parallel to the back plate.

Binding posts 68 permit connection in the well-known manner of wire conductors to the short circuiting and impulse sending contacts.

The unit 70 (Fig. 2) consists of a hollow non-conductor having the contact actuating pawl 63 and a finger 69. The finger 69 engages teeth 52 of wheel 53 and the pawl 63 projects between springs 59 and 60.

When the dial is moved in a clockwise direction wheel 53 is moved in the direction of the arrow (Fig. 3) by shaft 5 and teeth 52 engage finger 69 moving it as well as pawl 63 to the right against spring 60. Spring 60 prevents rotation of the unit 70 beyond a point where teeth 52 can engage the finger 69. When the dial is released and starts back in a counterclockwise direction each tooth 52 engages finger 69 moving it as well as pawl 63 to the left which latter presses against spring 59 sufficiently hard to break contact between 59 and 61 and send an impulse each time a tooth, of which there is one for each finger hole in the dial, passes finger 69.

The unit 70 is rotatably fastened to arm 43 of the mounting plate by screw 71 and washers 72 and 73. A coiled dampening spring 74 is provided within the unit around screw 71 to fix the unit yieldably in any position to which it has been moved. Spring 74 assures silent and efficient operation of the unit.

Referring to Figs. 1 and 1*a*, finger stop 75 is bent in a U-shaped around dial 1 and secured to back plate 4 by screw 76. The zero position stop for the dial consists of end 77 of the finger stop bent up at right angles towards the dial to form an abutment and an L-shaped leaf spring 78 adjacent end 77 and attached to the finger stop by screw 76. As the dial approaches zero position an element 79 on the underside of the dial engages spring 78 pressing it against end 77, to stop the dial. Spring 78 has a cushioning effect on the dial which reduces wear and diminishes noise.

What is claimed is:

1. In a substation impulse sender, a dial having a zero position and a plurality of operating positions, a shaft supporting said dial, a spring to bias said shaft for rotation toward zero position, a toothed wheel carried by said shaft, a set of contacts operable when actuated to send impulses, a contact actuating unit pivotally mounted on said dial and having a contact actuating pawl and a finger formed integral therewith, said finger being engageable by the teeth of said wheel to pivot said unit in a direction to remove said pawl from contact actuating position during movement of the dial away from zero position and to pivot said unit in the opposite direction to move said pawl into contact actuating position when the dial returns toward zero position, each tooth of said wheel being operative to rock said unit while in contact actuating position an amount sufficient to cause said pawl to actuate said contacts for transmission of an impulse, and a spring for dampening the movement of said unit.

2. In a substation impulse sender according to claim 1, further comprising a set of short circuiting contacts and means to actuate said short circuiting contacts as the dial is moved into and out of zero position.

3. In a substation impulse sender according to claim 1, further comprising a stop abutment for zero position, an element operatively positioned to engage said abutment to stop said dial in zero position and a spring having a free end disposed adjacent said abutment for engagement by said element just before the dial reaches zero position.

4. In a substation impulse sender according to claim 1, wherein the contact actuating unit comprises a hollow body a pivot pin mounted therein, said dampening spring disposed between said unit and said pivot pin and being operative to yieldably position said unit in response to actuation thereof by said wheel.

5. In a substation impulse sender, a dial having a zero position and a plurality of operating positions, a stop abutment for said zero position, an element operatively positioned on said dial to engage said abutment to stop said dial in said zero position and an L-shaped leaf spring having a free end disposed adjacent said abutment for engagement by said element at a predetermined point before said dial reaches said zero position.

6. In a substation impulse sender, a dial having a zero position and a plurality of operating positions, a finger stop, said finger stop having a dial stop abutment mounted thereon, a stop element operatively positioned on said dial to engage said abutment to stop said dial in said zero position and a spring mounted on said finger stop having a free end disposed adjacent said abutment for resiliently engaging said element at a predetermined point before said dial reaches said zero position.

7. In a substation impulse sender, a base plate, a hollow shaft mounted for rotation in said base plate, a dial carried by said shaft on one side of said plate, a helical spring operatively positioned in said shaft to bias said shaft for rotation in one direction, a second plate mounted on the backside of said base plate, screw adjustment means on said second plate for adjusting the tension on said spring, a governor mounted on said second plate and operatively positioned to be driven from said shaft, electrical contacts including a short circuiting set of contacts and an impulse sending set of contacts, means carried by said second plate for supporting said contacts, including a pair of flanges carried by said second plate and disposed in substantially parallel spaced relation on opposite sides of a plane containing the axis of said shaft, and means controlled by rotation of said shaft to actuate said contacts.

8. In a substation impulse sender according to claim 7, wherein the means controlled by rotation of said shaft includes a pivotally mounted toothed wheel, a rocking unit having a finger engageable by the teeth of said wheel and a pawl operatively positioned on said rocking unit to engage the impulse sending contacts each time the teeth engage said finger during movement of said dial toward zero position, and means carried by said wheel to actuate said short circuiting contacts as said dial is moved into and out of zero position.

9. In a substation impulse sender, the combination according to claim 7, wherein said second plate includes at least two arms by which said second plate is attached to said base plate, and two other arms to support said governor.

10. In a substation impulse sender, the combination according to claim 7, wherein said second plate comprises a single metal stamping having an opening through which said shaft extends and a plurality of arms, at least two of said arms being disposed to support said second plate on said base plate, two other of said arms being disposed in parallel relation to support said governor, another two of said arms to support said short circuiting and impulse sending contacts, and still another of said arms to support said rocking unit.

11. In a substation impulse sender, a base plate, a hollow shaft mounted for rotation in said plate, a dial secured to said shaft on the front side of said base plate, a helical spring disposed in said hollow shaft, a second plate mounted on the backside of said base plate, means carried by said second plate to anchor one end of said spring thereon, said means including a bracket and a spring engaging element rotatably adjustable in said bracket and being operative to adjust the tension of said spring, means for securing the other end of said spring to said shaft, two sets of contacts, means carried by said second plate to support one set of contacts on one side of said shaft and to support the other set of contacts on the opposite side of said shaft and means controlled by said shaft movement to actuate said two sets of contacts in a predetermined relationship depending upon the movement of said dial.

STEPHEN R. WAGNER.

REFERENCES CITED

The following references are of record in the file of this patent:

UNITED STATES PATENTS

| Number | Name | Date |
|---|---|---|
| 1,543,662 | Booth | June 30, 1925 |
| 1,609,982 | Blessing | Dec. 7, 1926 |
| 1,642,822 | Obergfell | Sept. 20, 1927 |
| 1,662,141 | Blades | Mar. 13, 1928 |